US012579634B2

(12) United States Patent
Seo

(10) Patent No.: US 12,579,634 B2
(45) Date of Patent: Mar. 17, 2026

(54) REAL-TIME PROCESS DEFECT DETECTION AUTOMATION SYSTEM AND METHOD USING MACHINE LEARNING MODEL

(71) Applicant: CREFLE Inc., Gyeonggi-do (KR)

(72) Inventor: Eunseok Seo, Seoul (KR)

(73) Assignee: CREFLE Inc., Seongnam-si (KR)

( * ) Notice: Subject to any disclaimer, the term of this patent is extended or adjusted under 35 U.S.C. 154(b) by 339 days.

(21) Appl. No.: 18/533,652

(22) Filed: Dec. 8, 2023

(65) Prior Publication Data

US 2024/0193759 A1 Jun. 13, 2024

(30) Foreign Application Priority Data

Dec. 9, 2022 (KR) ........................ 10-2022-0171756

(51) Int. Cl.
*G06T 7/00* (2017.01)
*G06Q 10/0633* (2023.01)
*G06V 10/25* (2022.01)

(52) U.S. Cl.
CPC ....... *G06T 7/0008* (2013.01); *G06Q 10/0633* (2013.01); *G06V 10/25* (2022.01); *G06T 2207/30164* (2013.01); *G06V 2201/07* (2022.01)

(58) Field of Classification Search
CPC ...... G06Q 10/0633; G06T 2207/30164; G06T 7/00; G06T 7/0004; G06T 7/0008; G06T 7/001; G06V 10/25; G06V 2201/06; G06V 2201/07
See application file for complete search history.

(56) References Cited

FOREIGN PATENT DOCUMENTS

| JP | 2006343952 | A | * | 12/2006 | ....... G05B 19/41875 |
|----|----|----|----|----|----|
| JP | 2009-80759 | A | | 4/2009 | |
| JP | 2013-97466 | A | | 5/2013 | |
| JP | 2022-522159 | A | | 4/2022 | |
| JP | 2022-70512 | A | | 5/2022 | |
| KR | 10-2003-0068676 | A | | 8/2003 | |
| KR | 10-1441230 | B1 | | 9/2014 | |
| KR | 10-2455733 | B1 | | 10/2022 | |

OTHER PUBLICATIONS

Murai et al., "Real-time work procedure monitoring system by deep learning and web camera using results of work analysis at manufacturing", IPSJ SIG Technical Report, vol. 2019-CDS-26, No. 23, Aug. 30, 2019, pp. 1-8 (9 pages total).

* cited by examiner

*Primary Examiner* — Michael J Vanchy, Jr.
(74) *Attorney, Agent, or Firm* — Sughrue Mion, PLLC

(57) ABSTRACT

An artificial intelligence-based process defect detection system may include: a photographing module that collects image data by capturing a process that progresses on an object; a machine learning model that generates work data that is a result of recognizing and reading the object based on the image data; and a detection module that receives instruction data recorded regarding a process for an object optimized for product production, detects a defect or a non-defect by comparing the work data with the instruction data, and generates defect information when the process is defective.

2 Claims, 3 Drawing Sheets

[FIG. 1]
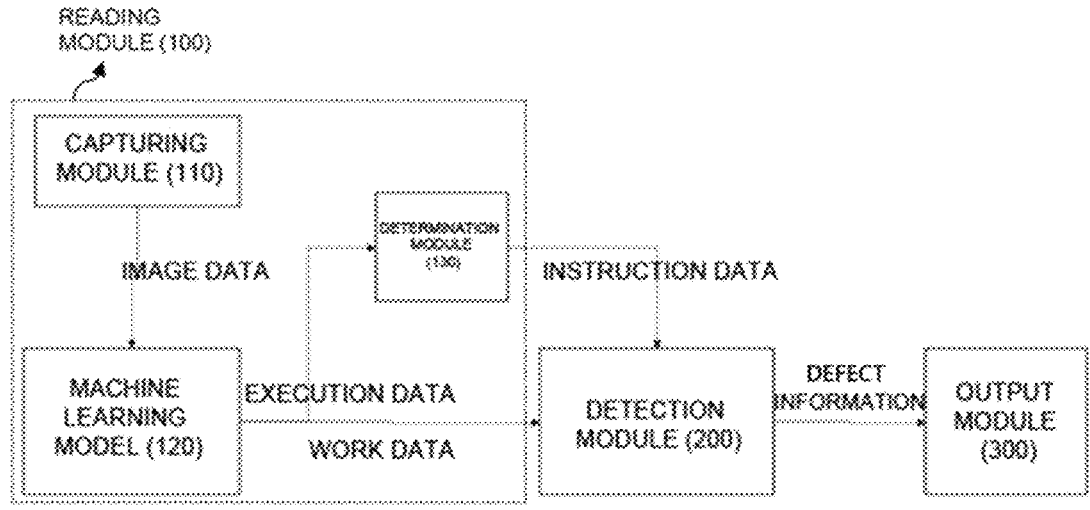

[FIG. 2]
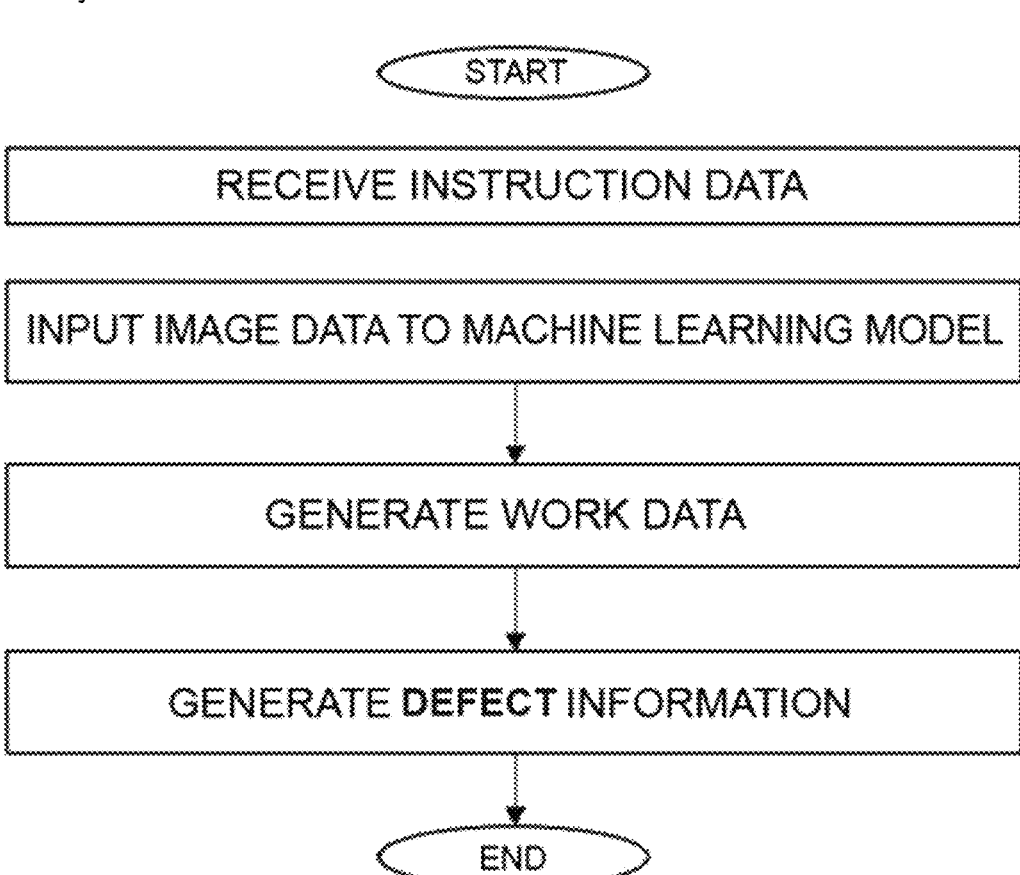

[FIG. 3]
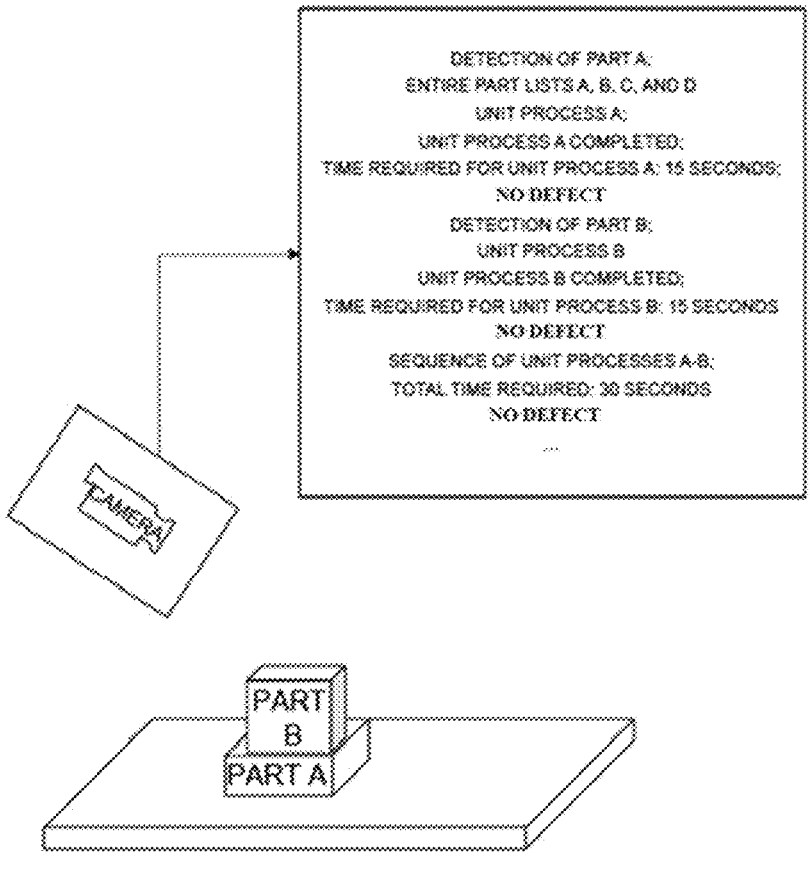

REAL-TIME PROCESS DEFECT DETECTION AUTOMATION SYSTEM AND METHOD USING MACHINE LEARNING MODEL

CROSS-REFERENCE TO RELATED APPLICATION

This application claims the benefit of Korean Patent Application No. 10-2022-0171756, filed on Dec. 9, 2022, in the Korean Intellectual Property Office, the disclosure of which is incorporated herein in its entirety by reference.

BACKGROUND

1. Field

The present disclosure relates to a real-time process defect detection automation system and method using machine learning model.

2. Description of Related Art

A process, which includes a plurality of unit processes for manufacturing one product, produces a finished or intermediate product by processing materials mechanically, physically, and chemically and changing the structure, characteristics, and outer appearance. As such a process has become more complicated, the work order proposed by engineers during a design process has included a significant number of items, and errors and defects that are not linked to actual on-site inspection and manufacturing equipment have become frequent.

As a result, it has become more difficult to reflect the know-how of actual workers, not engineers, in the work order. For example, there are some cases where a process sequence different from the work order is found to be more efficient due to the know-how of an experienced worker, but it is often not manualized because it is realistically difficult to apply it directly to the work order in terms of cost or responsibility.

Accordingly, there are several attempts (Korean Patent Registration No. 10-1441230, Korean Patent Publication No. 10-2003-0068676, etc.) to increase company productivity by improving process efficiency. However, such attempts have only theoretically proposed an appropriate process sequence using a regression model and had limitations in that it was difficult to directly apply to the work site.

In order to determine whether an optimization process with minimal defects was performed according to the work order at the work site even when the work order was established, sampling and inspection were required after all work had been performed, or work had to be stopped and workers had to manually collect internal data from inspection equipment and understand the collected internal data based on the worker's knowledge. As a result, even when a defect occurred in the middle of the process, the cause of the defect could only be analyzed after the product was completed. Accordingly, cause analysis was difficult and mass production of defective products could not be prevented.

Therefore, there is a need for a system that derives an optimized work order in real time without interruption at the work site and complies with the work order.

SUMMARY

An object of the present disclosure is to provide an artificial intelligence-based process defect detection method and system that can determine whether work has been performed according to work instructions.

However, the technical problems to be solved by the present embodiment are not limited to those described above, and other technical problems may exist.

An artificial intelligence-based process defect detection system according to an embodiment of the present disclosure may include: a photographing module that collects image data by capturing a process that progresses on an object; a machine learning model that generates work data that is a result of recognizing and reading the object based on the image data; and a detection module that receives instruction data recorded regarding a process for an object optimized for product production, detects a defect or a non-defect by comparing the work data with the instruction data, and generates defect information when the process is defective.

The process that progresses on the object may include unit processes having a series of sequences, the machine learning model may recognize that the object changes as each of the unit processes progresses, and may generate work data including sequence information obtained by reading a progress sequence of the process, and the detection module may generate defect information by detecting the process as a sequence defect when the sequence information of the work data is different from the sequence information of the instruction data.

The sequence information of the instruction data may be a progress sequence of a unit process executed in a minimum time among a plurality of executions in which the sequence of the unit processes is different.

The machine learning model may recognize an outer appearance of the object that changes as the process progresses, and may generate work data including state information obtained by reading a work state of the process, and the detection module may detect state information of the work data and state information of the instruction data as being normal when the state information of the work data and the state information of the instruction data are determined to be similar to each other using a predefined error criterion, and may generate defect information by detecting the state information of the work data and the state information of the instruction data as a state defect when the state information of the work data and the state information of the instruction data are different from each other.

The state information may be information about a state of an assembly direction and a degree of assembly of the object.

The machine learning model may detect a work area in which the object is processed, and may generate work data including location information, and the detection module may search for location information corresponding to the generated defect information from the work data.

The detection module may transmit the defect information to an output module using the location information so that the output module located in the work area in which the process progresses outputs the location information.

The machine learning model may recognize that the object changes as the process progresses, and may generate work data including time information that is a result of reading a time required for the process, and the detection module may generate defect information as a time defect when time information of the work data is different from the time information of the instruction data.

An artificial intelligence-based process defect detection method according to an embodiment of the present disclosure may include: a step in which a capturing module inputs, to a machine learning model, image data generated by capturing a process that progresses on an object; a step in which the machine learning model recognizes the object using the image data, generates work data for the progressed process, which is a result of reading the image data, and transmits the work data to the detection module; and a step where the detection module detects the presence or absence of defect by comparing the work data with instruction data obtained by recording an optimization process for a product produced by processing the object.

The process that progresses on the object may include unit processes having a series of sequences, a work module in which a work area where the object is processed is located may be further included, the machine learning model may generate work data including location information of the work module by detecting the work area of the work module, the machine learning model may recognize that the object changes as each of the unit processes progresses, and may generate work data including sequence information obtained by reading the sequence of the process, the machine learning model may recognize an outer appearance of the object that changes as the process progresses, and may generate work data including state information obtained by reading a work state of the process, and the detection module may generate defect information including the work state, the sequence of the progress, and the work area by comparing the work data with the instruction data.

The machine learning model may measure similarity to the image data based on normal image data collected in advance for the object, and may generate work data including state information obtained by reading the work state of the unit process on the image data using a predefined similarity criterion, a searching module that searches for an object related to the object when there is no normal image data collected in advance for the object may be included, the similarity to the image data may be measured using the normal image data collected in advance for an object related to the object searched for by the searching module, and the detection module may detect state information of the work data and state information of the instruction data as being normal when the state information of the work data and the state information of the instruction data are determined to be similar to each other using a predefined error criterion, and may generate defect information by detecting the state information of the work data and the state information of the instruction data as a state defect when the state information of the work data and the state information of the instruction data are different from each other.

BRIEF DESCRIPTION DRAWINGS

FIG. 1 is a relationship diagram of an artificial intelligence-based process optimization system according to an embodiment of the present disclosure.

FIG. 2 is a flowchart of an artificial intelligence-based process optimization method according to an embodiment of the present disclosure.

FIG. 3 illustrates a process of implementing an artificial intelligence-based process optimization system according to an embodiment of the present disclosure.

DETAILED DESCRIPTION

An artificial intelligence-based process optimization management system according to an embodiment of the present disclosure provides a process optimization system capable of determining an optimal process scenario among a plurality of process scenarios in which the sequence of unit processes is different.

Specifically, the artificial intelligence-based process optimization management system according to an embodiment of the present disclosure includes one or more unit processes in which the entire process for manufacturing a product is executed in a series of sequences, and when the unit processes are executed in different sequences, determines an optimal execution among a plurality of executions performed while changing the progress sequence of the unit processes.

In the process of deriving the optimal execution or even after the optimal execution is derived, it is possible to detect how far the execution deviates from the optimal execution by recording data and allowing a processor to read the data so that whether a current process is being executed well can be detected based on the recorded data.

The reading module 100 may collect and read image data about a process executed on an object prepared for product manufacturing.

The object may refer to materials or parts for producing a product through a manufacturing process.

That is, the reading module 100 may generate work data by reading image data for a process that is being currently progressing in accordance with existing instruction data.

The reading module 100 may include a capturing module 110 and a machine learning model 120.

The capturing module 110 may generate image data by capturing the process that progresses on the object. The capturing module 110 may include a plurality of cameras installed in the process line and may transmit captured image data from the cameras to the machine learning model 120.

The cameras used by the capturing module 110 may sense the process that progresses on the object through various radio waves, such as infrared rays, visible rays, X-rays, gamma rays, electromagnetic waves, and ultrasonic waves. The image data may be a two-dimensional (2D) image, a three-dimensional (3D) image, a preprocessed region-of-interest (ROI) image, a cropped image, and the like.

The machine learning model 120 may generate work data for the ongoing process by recognizing and reading the object using the image data.

The machine learning model 120 may recognize the change of the object as each unit process progresses, may read the progress sequence of the process, and may generate work data including sequence information about the progress sequence of the process.

The machine learning model 120 may recognize the object of the unit process through the image data generated by capturing the unit process while the unit process progresses sequentially. In this manner, the type of the unit process may be specified. If the object is completely changed, the unit process is also specified differently. Accordingly, it may be read that a next unit process progressed after a previous unit process was completed. The machine learning model 120 may determine the sequence until all unit processes progress in the same method as described above, may specify the overall process execution and the type of the process execution, and may generate work data including sequence information of the relevant process execution.

Likewise, the machine learning model 120 may read the work state of the process by recognizing the outer appearance of the object that changes as the process progresses, and may generate work data including state information about the work state.

In other words, when the object is specified, the machine learning model 120 may read the work state of the unit process through the degree of deformation in the outer appearance of the object recognized through image data before and after the relevant unit process. The outer appearance may include a shape, a color, a surface, and an interior.

For example, when the process is an assembly work using parts as an object, a result of executing a first unit process on a first part as the object may be read through the degree of deformation in the outer appearance of the part as the result of the assembly work. After the machine learning model 120 recognizes the object through the image data, the work state, such as the strength of the assembly or the direction in which the first part is assembled, may be numerically measured, and work data may be generated using state information obtained by recording the numerically measured work state.

Alternatively, the machine learning model 120 may measure similarity by comparing the image data for the object with previously collected normal assembly image data, and may generate work data using state information obtained by recording the measured similarity value.

In addition, when there is no normal image data collected in advance for the object, the machine learning model 120 may measure similarity to the image data using normal image data collected in advance for an object related to the object, which is found by a searching module that searches for an object related to the object.

The machine learning model 120 may detect the work area in which the object is processed, and may generate work data including location information.

The work area may refer to a place where a specific unit process is executed in a type of work line, or may refer to a partial region of a facility where the process is executed.

Of course, the location may be acquired using a global positioning system (GPS) module that may be included in the machine learning model 120, and work data including the location information may be generated.

In this manner, defect information that may have been previously generated may be matched with the location information and stored as the work data, and defect information about defects occurring in the relevant work area may be searched for from the location information.

In addition, the machine learning model 120 may read the time required for the process by recognizing that the object changes as the process progresses, and may measure the error and time required for the optimal process execution by comparing time information, which is the required time, with time information on instruction data In the future, the detection module 200 may evaluate the error in terms of the worker's skill level, excluding environmental factors such as temperature and humidity in the work area.

Meanwhile, the reading module 100 may collect sensing data corresponding to quality factors or external factors using a sensing module, and may read the process of the object in accordance with a preset criterion.

The sensing module may collect the sensing data from the outside through various general sensors, such as a microphone, a proximity sensor, an ultrasonic sensor, a gyro sensor, a vibration sensor, a temperature/humidity sensor, a pressure sensor, an impact sensor, and a gas sensor.

The quality factors may be pressure applied to the object, moving speed of the object, vibration, temperature, humidity, specific gravity of the object, shrinkage, strength, weather environment, lighting environment, equipment life, equipment information, a worker's skill, material properties, the number of cycles, and the like.

The reading module 100 may collect the sensing data for general process optimization and may use regression analysis or machine learning to identify a relationship between quality parameters affected by the collected sensing data among the set quality parameters.

When a functional relationship is formed between the quality factors and the quality parameters, an optimization algorithm may be used to find, as an input parameter, the quality factor that causes an output parameter, which is the quality parameter, to have a desired value. The input parameter value for optimal execution may be reflected to the instruction data.

The detection module 200 may receive the work data from the reading module 100, may determine whether the process is normal or defective by comparing the work data with the instruction data, and may generate defect information when the process is defective.

The defect type of the defect information may include a defect regarding the sequence of progress, a defect regarding the work state, and a defect regarding the required time.

The detection module 200 may compare the work data with the instruction data to compare one or more defect types, and may generate defect information such as a sequence defect, a state defect if the work state is defective, and a required time defect if the required time is defective.

Preferably, there may be a predefined error range or similarity criterion for distinguishing between a case where the work state is normal and a case where the work state is defective.

The detection module 200 may compare the state information on the work data with the state information on the instruction data, may determine as being normal when the detection module 200 determines that the state information on the work data and the state information on the instruction data are within a preset error range, and may generate defect information as the state defect when the detection module 200 determines that the state information on the work data and the state information on the instruction data are outside the error range.

The detection module 200 may analyze the sensing data about the unit process in which a defect has occurred, may compare the sensing data with the quality factor according to optimal execution on the instruction data, may find and record the type of the quality factor that cause the defect, and may store the type of the quality factor together with the defect information.

The output module 300 may output the defect information generated by the detection module 200.

When the defect information is generated during the process, the output module 300 may receive location information searched for from the work data in real time. In other words, in the work data, a signal about the defect information may be output to the work area based on the location information of the unit process in which the defect has occurred.

The signal may be a visual, auditory, or tactile signal and is not particularly limited.

For example, the output module 300 may include a display that is installed in the work area specified from the location information of the unit process, in which the defect information was generated during the process, and visually outputs, to the worker, a signal indicating that the defect has occurred, a sound module that provides sound warning, and a vibration module that is attached to the worker and outputs vibration.

The output module 300 may include an input module as necessary. The input module may receive information about the occurrence of atypical defect from the worker.

In addition, the output module 300 may include a worker terminal that is preset as working around the work area specified from the location information of the unit process in which the defect information was generated during the process, or that may be detected by the system.

The output module 300 may output the quality factor, which is estimated as the cause of the defect, together with the defect information.

For example, in the case of an assembly process, when the assembly/fastening strength of the parts is weak in the second unit process and the reading module 100 generates work data including state information, which is a numerical value obtained by measuring the assembly/fastening strength, the detection module 200 may detect the work state as being defective by comparing the work data with the instruction data, and may generate defect information for the defective work state. The output module 300 may output the defect information to the work area in which the defect has occurred, and if necessary, may output the quality factor estimated as the cause of the defect.

Meanwhile, the reading module 100 may generate the instruction data.

For example, the process for a plurality of products may be divided into a plurality of unit processes. By analyzing the work data acquired while executing the process several times while preferably changing the sequence of the unit processes, the work data of the execution with the minimum required time may be determined as the optimal process sequence for the product.

The reading module 100 may transmit, to a database, the instruction data about the optimal execution for each product so that the instruction data is stored in the database.

Hereinafter, a method by which the reading module 100 generates the instruction data will be described in detail.

The reading module 100 may further include a determination module 130.

Based on execution data, the determination module 130 may generate instruction data as execution data for optimal execution determined among a plurality of executions that are performed while changing the sequence of the unit processes.

While the unit processes progress sequentially, each unit process is evaluated in accordance with an evaluation criterion, and execution data may be collected by cumulatively evaluating the unit processes in sequence.

The work data and the execution data may be information generated by the same category, but in the method of generating the instruction data, the work data and the execution data are described as execution data so as to distinguish the work data and the execution data from the data generated by the reading module 100.

For example, the unit process may refer to one of a plurality of part assembly processes for producing one product.

The evaluation criterion may be set as necessary, based on factors that affect the yield and quality of the process, such as required time or defect rate.

The reading module 100 may specify the type of unit process through information collected from the unit processes while the unit processes progress sequentially, and may determine the type of process execution by identifying the progress sequence of the unit processes.

The process execution refers to a type of scenario attempted by changing the sequence of unit processes. Even for the same unit process, the process scenario changes when the sequence of the unit process changes. In the present disclosure, information may be collected from the object for which the optimal process execution is to be determined among process executions in which the progress sequence of unit processes is different. Then, the unit process may be specified and the sequence may be identified, so as to be mapped with execution data for each process execution.

For example, while the unit processes progress, the required time may be evaluated from a specific time when the unit process is specified by determining the object until the unit process is completed. At the same time or at different times, the completion state of the unit process may be identified and the presence or absence of defect may be evaluated.

Thereafter, when the next unit process progresses, the required time and the presence or absence of defect may be similarly evaluated. At the same time or at different times, execution data may be collected by cumulatively evaluating the required time and the presence or absence of defect from the start of the entire process to the present.

For the completion state of the unit process, the unit process may be evaluated as being completed when the object is changed. The completion state of the unit process may also be determined based on data about the fastening degree, fastening direction, and deviation of the assembled parts.

More preferably, there may be an entire process list or a list of products manufactured using the object. The reading module 100 may receive the entire process list or the list of the products and may perform evaluation whenever the unit process of one object is completed. When all unit processes in the entire process list have been evaluated, the reading module 100 may determine that the entire processes or one execution has been completed, and may terminate collection by inputting the collected execution data to the determination module 130.

In addition, the searching module included in the reading module 100 may search for a list including the object first recognized by the machine learning model in a database in which various types of entire process lists are collected, and may input the list to the machine learning model 120.

The machine learning model 120 may be used to determine the object based on the information collected from the unit process and to specify the completion or non-completion of the unit process, the presence or absence of defect, or the type of unit process.

At this time, the machine learning model 120 may be improved by continuously learning the images of the object using an object detection algorithm of one or more of vision fitting, edge, color, and location through an application mounted thereon. The machine learning model 120 may determine the presence or absence of defect or the completion or non-completion of the unit process by specifying the type of unit process or recognizing the assembly or missing state of the object.

Specifically, the machine learning model 120 may be improved by learning the images expressing the shape and color of the object using deep learning or machine learning, which is an algorithmic artificial intelligence technology for classifying or learning the features of the image data on its own, and may specify the type of unit process by classifying and detecting the objects.

The machine learning model 120 may allow the processor to process data. When detecting the object, the machine learning model 120 may generate training data by preprocessing image data of the object.

The training data may be labeled with assembly state, defect state, and unit process type information for the object together with the preprocessed image data.

Information about the object to be labeled may also be collected through a worker's feedback. That is, when many defect cases of the object are not initially discovered, part information of the object may be input using the input interface and labeled with the corresponding image data, or the completion or non-completion of assembly and the presence or absence of defect may be input and labeled.

A classifier model may be learned using the labeled data and applied to the machine learning model 120.

While the unit process progresses, the image data collected through the camera may be preprocessed, and then, the classifier model may be used to detect the object, the presence or absence of defect of the object, the completion or non-completion of assembly, and the like.

Meanwhile, in an embodiment of the present disclosure, normal image data collected when the unit process for the object is executed normally without defects may be collected in advance.

The machine learning model 120 may measure similarity to newly collected image data based on the normal image data, may read the image data as the normal image data using a predefined similarity criterion, and may collect a new normal image as execution data.

If necessary, the features may be extracted from the collected normal image data, and the machine learning model 120 may learn only the normal image data.

At this time, when the product is improved or newly released, some or all of the parts or processes used in the product may be different from the existing products. Therefore, image data collected in advance for the object may not exist.

The reading module 100 may collect normal image data for improved new product processes by measuring the similarity to the image data obtained by capturing the object of the improved product using the normal image data that the machine learning model 120 collects for previous version of products in order to immediately determine the process of the improved new product without collecting image data.

In addition to the above description, the machine learning model 120 may use general deep learning vision or machine vision (MV) and may include a hardware, software or interface used to inspect wafers, surface defect inspection of display products, printed circuit board (PCB) defect inspection, light-emitting diode (LED) chip packages, and other products in the factory automation process of industrial companies.

The process in which the reading module 100 collects execution data may be repeated until all unit processes are completed.

The determination module 130 determines the optimal process execution among a plurality of process executions based on the collected execution data.

Specifically, when the execution data for the process execution specified by the reading module 100 and the execution data for each of the plurality of process executions are collected by the reading module 100, the determination module 130 may use the execution data to determine whether the specified process execution is an optimal process execution.

According to an embodiment of the present disclosure, one of the optimal process executions may be a case where the sum of the total unit process times is minimum.

That is, whenever each unit process progresses, the machine learning model 120 of the reading module 100 may be used to collect the execution data measured with respect to the evaluation criterion, which is the required time and the defect rate for each unit process. When the sum of the times required for the unit process in the execution of a certain process according to the execution data is a minimum time, the determination module 130 may determine the process execution as the optimal process execution.

In addition, the machine learning model 120 may calculate the defect rate by identifying the work state of the process and may reflect the defect rate to the evaluation. Meanwhile, the execution data collected from the reading module 100 may be labeled with the process executions and then stored, and may establish a big data database about the process executions. The big data database may be established by managing the history of execution data, including process execution time, defect rate, and the like.

Information about the worker in charge may be labeled and stored in the big data database together with the execution data while the process progresses.

Thereafter, the determination module 130 may generate instruction data as execution data for optimal process execution. Specifically, an existing work order format may be secured from a manufacturing execution system (MES) and the optimal process execution may be merged into the format to generate instruction data as a new work order. The new work order may be output through the output module 300, such as a display of a work table in which a relevant process progresses.

When worker information is reflected in the execution data and collected for process execution with respect to different workers, it is possible to increase the reproduction rate of the work order to which the optimal process execution is reflected by reducing errors in the time required for process execution or the defect rate due to the difference in a worker's skill level.

In other words, when information about the worker's skill level or the like is reflected to the implementation data, the determination module 130 may determine the optimal process execution for each skill level by distinguishing between execution data of a skilled worker's process execution and execution data of an unskilled worker's process execution.

Preferably, the execution data may be managed differently for each worker, and thus, the optimal process execution may be proposed for each worker.

FIG. 3 illustrates a process of implementing an artificial intelligence-based process optimization management system according to an embodiment of the present disclosure.

Hereinafter, an embodiment of an artificial intelligence-based process optimization system will be described with reference to FIG. 3.

FIG. 3 illustrates a process in which image data collected by the capturing module during the process of assembling part A and part B is generated and collected as execution data by the machine learning model 120 of the reading module 100.

As illustrated in FIG. 3, in the artificial intelligence-based process optimization management system, the machine learning model 120 may first detect part A, which is the object, and may specify the unit process type A. The reading module 100 may search for the entire part lists A, B, C, and D of the product including the object of the specified unit process A.

The completion or non-completion of the specified unit process A is checked through the machine learning model 120.

The reading module 100 may collect execution data of the unit process A by evaluating, in real time, the time required until the specified unit process A is completed and the presence or absence of defect.

When the next unit process B progresses, the machine learning model 120 may detect and recognize that the object has changed. In other words, the machine learning model 120 may determine whether the object has changed by determining that the new part B has been added to the object and the shape or color of the new part B has changed through the image.

Likewise, the reading module 100 may collect execution data by evaluating, in real time, the completion or non-completion of the unit process B, which is specified as the changed object, the required time, and the presence or absence of defect.

In addition, the reading module 100 may record and store the progress from the unit process A to the unit process B.

When the unit process B is completed, the reading module 100 may collect execution data by cumulatively evaluating, in real time, the time required from the beginning to the present, the presence or absence of defect, and the like.

The above-described process may be executed until a series of unit processes are completed by assembling all parts A, B, C and D of the product.

The plurality of process executions may be unit process permutations. When the entire part lists are A, B, C, and D, there are a total of 4! types of process executions: A-B-C-D, A-B-D-C, A-C-B-D, A-C-D-B, A-D-B-C, A-D-C-B, B-A-C-D, B-A-D-C, . . . , D-C-B-A.

Each process execution may be evaluated through the above-described process and execution data may be collected. When one type of execution is repeatedly performed, the time required for the process execution or the presence or absence of defect may be cumulatively collected and stored.

Of course, not all process executions need to be evaluated, and some types of process executions may not be evaluated when the process is impossible or according to the worker's choice.

When sufficient execution data is accumulated by the machine learning model 120, the determination module 130 may determine the optimal process execution among the evaluated process executions based on the collected execution data.

For example, as shown in Table 1 below, in a case where, when the A-B-C-D process is executed 30 times, an average required time is 1 minute and 20 seconds, an average error is 10 seconds, and a defect rate is 5%, and when the B-C-A-D process is executed 25 times, an average required time is 1 minute and 40 seconds, an average error is 30 seconds, and a defect rate is 7%, if the predefined condition is that the minimum required time takes priority, the determination module 130 may determine that A-B-C-D, which is the minimum required time, is the optimal process execution.

| Process execution | Required time | Error average | Defect rate | Optimal/Non-optimal |
|---|---|---|---|---|
| A-B-C-D | 1 minute 20 seconds | 10 seconds | 5% | O |
| B-C-A-D | 1 minute 40 seconds | 30 seconds | 7% | X |

The artificial intelligence-based process optimization system according to an embodiment of the present disclosure automatically monitors and evaluates process progress. Therefore, the artificial intelligence-based process optimization system according to an embodiment of the present disclosure may determine the optimal process sequence based on the worker's field experience even among unit processes that are not dependent on each other, and may determine the optimal process execution while the process progresses naturally without separate simulation.

FIG. 2 is a flowchart of an artificial intelligence-based process optimization management method according to an embodiment of the present disclosure.

The artificial intelligence-based process optimization management method according to an embodiment of the present disclosure may include: a step in which the reading module receives instruction data recorded for optimal execution determined among a plurality of executions that are performed while changing the sequence of unit processes; a step in which the reading module generates image data for a process performed on an object and generates work data, which is a result of reading the image data, so as to correspond to the instruction data; a step in which the detection module receives the work data and generates defect information about the process by comparing the work data with the instruction data; and a step in which the output module receives and outputs the defect information.

Throughout the present specification, a machine learning model, a deep learning-based model, a computational model, a neural network, a network function, a deep neural network, and a neural network may be used with the same meaning.

A deep neural network (DNN) may refer to a neural network that includes an input layer, an output layer, and a plurality of hidden layers. The DNN may be used to identify latent structures of data. In other words, the latent structures of photos, text, videos, voices, and music (e.g., what object is in the photo, what is the content and emotion of the text, what is the content and emotion of the voice, etc.) may be identified. The DNN may include a convolutional neural network (CNN), a recurrent neural network (RNN), an autoencoder, a generative adversarial network (GAN), a restricted Boltzmann machine (RBM), a deep belief network (DBN), a Q network, a U Network, a Siamese network, and the like. The description of the DNN is only an example and the present disclosure is not limited thereto.

In an embodiment of the present disclosure, the network function may include an autoencoder. The autoencoder may be a type of artificial neural network for outputting output data similar to input data. The autoencoder may include at least one hidden layer, and an odd number of hidden layers may be disposed between input and output layers. The number of nodes in each layer may be reduced from the number of nodes in the input layer to an intermediate layer called a bottleneck layer (encoding), and then expanded in symmetry with the reduction from the bottleneck layer to the output layer (symmetrical to the input layer). The autoencoder may perform nonlinear dimensionality reduction. The number of input layers and output layers may correspond to the dimension after preprocessing of the input data. The autoencoder may have a structure in which the number of nodes in the hidden layer included in the encoder is reduced as the distance from the input layer increases. When the number of nodes in the bottleneck layer (the layer with the fewest nodes located between the encoder and the decoder) is too small, a sufficient amount of information may not be transmitted. Therefore, the number of nodes in the bottleneck layer may be maintained above a certain number (e.g., more than half of the input layers, etc.).

The neural network may be trained in at least one of supervised learning, unsupervised learning, semi-supervised learning, or reinforcement learning. The training of the neural network may be a process of applying, to the neural network, knowledge for the neural network to perform a specific operation.

The neural network may be trained to minimize output errors. The training of the neural network may be a process of repeatedly inputting training data to the neural network, calculating the output of the neural network and the error of the target for the training data, and updating the weight of each node in the neural network by backpropagating the error of the neural network from the output layer to the input layer of the neural network in order to reduce errors. In the case of supervised learning, training data (i.e., labeled training data) in which the correct answer is labeled in each training data may be used, and in the case of unsupervised learning, the correct answer may not be labeled in each training data. That is, for example, in the case of supervised learning regarding data classification, the training data may be data in which each training data is labeled with a category. The labeled training data may be input to the neural network, and the error may be calculated by comparing the output (category) of the neural network with the label of the training data. As another example, in the case of unsupervised learning regarding data classification, the error may be calculated by comparing the input training data with the output of the neural network. The calculated error is backpropagated in the neural network in the reverse direction (i.e., from the output layer to the input layer), and the connection weight of each node in each layer of the neural network may be updated according to the backpropagation. The amount of change in the connection weight of each updated node may be determined according to a learning rate. The calculation of the neural network for the input data and the backpropagation of errors may constitute a learning cycle (epoch). The learning rate may be applied differently according to the number of repetitions of the learning cycle of the neural network. For example, in the early stage of the training of the neural network, a high learning rate may be used to increase efficiency by allowing the neural network to quickly achieve a certain level of performance, and in the later stage of the training of the neural network, a low learning rate may be used to increase accuracy.

In the learning of the neural network, training data may generally be a subset of actual data (i.e., data to be processed by using the learned neural network). Therefore, there may be a learning cycle in which an error for training data decreases, but an error for actual data increase. Overfitting is a phenomenon in which an error for actual data increases due to excessive learning of training data. For example, a phenomenon in which a neural network that has learned cats by showing a yellow cat fails to recognize that a cat other than the yellow cat is a cat may be a type of overfitting. The overfitting may serve as a cause to increase an error of a machine learning algorithm. In order to prevent the overfitting, various optimization methods may be used. In order to prevent the overfitting, methods, such as the increase of training data, regularization, dropout that disables some nodes in the network during the learning process, the use of batch normalization layer, may be applied.

Although it has been described that the present disclosure can be generally implemented by a computing device, but those of ordinary skill in the art will appreciate that the present disclosure can be implemented in combination with computer-executable instructions and/or other program modules that can be executed on one or more computers, and/or in a combination of hardware and software.

Generally, program modules include routines, programs, components, data structures, etc. that perform specific tasks or implement specific abstract data types. In addition, those of ordinary skill in the art will appreciate that the methods of the present disclosure may be practiced with other computer system configurations, including single-processor or multiprocessor computer systems, minicomputers, mainframe computers, personal computers, handheld computing devices, microprocessor-based or programmable household appliances, and the like (each of which can operate in connection with one or more associated devices).

The embodiments described in the present disclosure can also be practiced in a distributed computing environment where certain tasks are performed by remote processing devices that are linked through a communication network. In the distributed computing environment, program modules can be located in both local and remote memory storage devices.

Computers typically include a variety of computer-readable media. Any media that are accessible by a computer can be computer-readable media. Such computer-readable media includes volatile and non-volatile media, transitory and non-transitory media, and removable and non-removable media. As a non-restrictive example, computer-readable media may include computer-readable storage media and computer-readable transmission media. The computer-readable storage media may include any volatile, non-volatile, removable, and non-removable media that are implemented in any method or technology for storage of information, such as computer-readable instructions, data structures, program modules, or other data. The computer-readable storage media include random access memory (RAM), read-only memory (ROM), electrically erasable programmable read-only memory (EEPROM), flash memory or other memory technology, compact disk-ROM (CD-ROM), digital video disk (DVD), or other optical disk storage device, magnetic cassette, magnetic tape, magnetic disk storage or other magnetic storage device, or any other medium that can be accessed by a computer and used to store desired information, but the present disclosure is not limited thereto.

Various embodiments presented herein may be implemented as a method, apparatus, or article of manufacture using standard programming and/or engineering technologies. The term "article of manufacture" includes computer programs, carriers, or media that are accessible from any computer-readable storage device. For example, the computer-readable storage medium includes magnetic storage devices (e.g., hard disks, floppy disks, magnetic strips, etc.), optical discs (e.g., CDs, DVDs, etc.), smart cards, and flash memory devices (e.g., EEPROM, cards, sticks, key drives, etc.), but the present disclosure is not limited thereto. In addition, various storage media presented herein include one or more devices and/or other machine-readable media for storing information.

It will be understood that the specific order or hierarchical structure in the steps of the presented processes is an example of illustrative approaches. It will be understood that the specific order or hierarchical structure in the steps of the processes may be rearranged within the scope of the present disclosure based on design priorities. Although the appended method claims present elements of various steps in a sample order, but it does not mean that the appended method claims are limited to the presented particular order or hierarchical structure.

According to the present disclosure, there are the following effects.

First, by automatically monitoring and evaluating the progress of process, the optimal process sequence may be determined based on a worker's field experience even among unit processes that are not dependent on each other.

Second, it is possible to determine whether the process follows the optimal process sequence while the process progresses naturally without a separate simulation.

Third, since defects are detected by collecting data for each unit process that is part of the overall process, it is easy to identify the unit process in which a defect occurred.

However, the effects of the present disclosure are not limited to those described above, and the effects that are not mentioned herein will be clearly understood from the present specification and accompanying drawings by those of ordinary skill in the art.

The description of the presented embodiments is provided to enable those of ordinary skill in the art to use or practice the present disclosure. Various modifications to such embodiments will be apparent to those of ordinary skill in the art, and the general principles defined herein may be applied to other embodiments without departing from the scope of the present disclosure. Therefore, the present disclosure is not limited to the embodiments presented herein, but should be interpreted in the broadest scope consistent with the principles and novel features presented herein.

DESCRIPTION OF SYMBOLS

100: reading module
110: capturing module
120: machine learning model
130: determination module
200: detection module
300: output module

What is claimed is:

1. An artificial intelligence-based process defect detection system comprising:
  a photographing module that collects image data by capturing a process that progresses on an object;
  a machine learning model that generates work data that is a result of recognizing and reading the object based on the image data;
  a detection module that receives instruction data recorded regarding a process for an object optimized for product production, detects a defect or a non-defect by comparing the work data with the instruction data, and generates defect information when the process is defective;
  a reading module evaluates each unit process according to an evaluation standard, and accumulates and evaluates the unit processes in order, generating execution data that is collected and transmitted to a determination module;
  the determination module determines the optimal execution from among multiple executions performed by changing the order of the unit processes based on the execution data of the reading module;
  the optimal execution is determined by the determination module to be an execution in which the total required time or defect rate of the unit process recorded in the execution data is minimum;
  where in the process that progresses on the object includes unit processes having a series of sequences,
  a work module in which a work area where the object is processed is located is further included, the machine learning model generates work data including location information of the work module by detecting the work area of the work module,
  the machine learning model recognizes that the object changes as each of the unit processes progresses, and generates work data including sequence information obtained by reading the sequence of the process,
  the machine learning model recognizes an outer appearance of the object that changes as the process progresses, and generates work data including state information obtained by reading a work state of the process, and
  the detection module generates defect information including the work state, the sequence of the progress, and the work area by comparing the work data with the instruction data;
  where in the machine learning model measures similarity to the image data based on normal image data collected in advance for the object, and generates work data including state information obtained by reading the work state of the unit process on the image data using a predefined similarity criterion,
  a searching module that searches for an object related to the object when there is no normal image data collected in advance for the object is included,
  the similarity to the image data is measured using the normal image data collected in advance for an object related to the object searched for by the searching module, and
  the detection module detects state information of the work data and state information of the instruction data as being normal when the state information of the work data and the state information of the instruction data are determined to be similar to each other using a predefined error criterion, and generates defect information by detecting the state information of the work data and the state information of the instruction data as a state defect when the state information of the work data and the state information of the instruction data are different from each other.

2. An artificial intelligence-based process defect detection method comprising:
  a step in which a capturing module inputs, to a machine learning model, image data generated by capturing a process that progresses on an object;
  a step in which the machine learning model recognizes the object using the image data, generates work data for the progressed process, which is a result of reading the image data, and transmits the work data to the detection module; and
  a step where the detection module detects the presence or absence of defect by comparing the work data with instruction data obtained by recording an optimization process for a product produced by processing the object;
  a reading module evaluates each unit process according to an evaluation standard, and accumulates and evaluates the unit processes in order, generating execution data that is collected and transmitted to a determination module;
  the determination module determines the optimal execution from among multiple executions performed by changing the order of the unit processes based on the execution data of the reading module;
  the optimal execution is determined by the determination module to be an execution in which the total required time or defect rate of the unit process recorded in the execution data is minimum;

where in the process that progresses on the object includes unit processes having a series of sequences, a work module in which a work area where the object is processed is located is further included, the machine learning model generates work data including location information of the work module by detecting the work area of the work module, the machine learning model recognizes that the object changes as each of the unit processes progresses, and generates work data including sequence information obtained by reading the sequence of the process, the machine learning model recognizes an outer appearance of the object that changes as the process progresses, and generates work data including state information obtained by reading a work state of the process, and the detection module generates defect information including the work state, the sequence of the progress, and the work area by comparing the work data with the instruction data;

wherein the machine learning model measures similarity to the image data based on normal image data collected in advance for the object, and generates work data including state information obtained by reading the work state of the unit process on the image data using a predefined similarity criterion, a searching module that searches for an object related to the object when there is no normal image data collected in advance for the object is included, the similarity to the image data is measured using the normal image data collected in advance for an object related to the object searched for by the searching module, and the detection module detects state information of the work data and state information of the instruction data as being normal when the state information of the work data and the state information of the instruction data are determined to be similar to each other using a predefined error criterion, and generates defect information by detecting the state information of the work data and the state information of the instruction data as a state defect when the state information of the work data and the state information of the instruction data are different from each other.

* * * * *